United States Patent
Szklarzewicz et al.

(10) Patent No.: US 12,180,231 B2
(45) Date of Patent: Dec. 31, 2024

(54) MOLECULAR MAGNETIC MATERIAL AND A METHOD FOR PREPARATION THEREOF

(71) Applicant: UNIWERSYTET JAGIELLONSKI, Cracow (PL)

(72) Inventors: Janusz Szklarzewicz, Cracow (PL); Maciej Hodorowicz, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 497 days.

(21) Appl. No.: 17/604,819

(22) PCT Filed: Apr. 9, 2020

(86) PCT No.: PCT/EP2020/060118
§ 371 (c)(1),
(2) Date: Oct. 19, 2021

(87) PCT Pub. No.: WO2020/216627
PCT Pub. Date: Oct. 29, 2020

(65) Prior Publication Data
US 2022/0177501 A1   Jun. 9, 2022

(30) Foreign Application Priority Data

Apr. 25, 2019 (EP) ..................... 19461529
Jul. 1, 2019 (EP) ..................... 19183528

(51) Int. Cl.
*C07F 11/00* (2006.01)
*H01F 1/42* (2006.01)

(52) U.S. Cl.
CPC ............... *C07F 11/00* (2013.01); *H01F 1/42* (2013.01)

(58) Field of Classification Search
CPC .................... C07F 11/00; H01F 1/42
See application file for complete search history.

(56) References Cited

PUBLICATIONS

Szklarzewicz, Janusz, et al., 13 Polyhedron 1755-1762 (1994) (Year: 1994).*
J. Szklarzewicz, 205 Inorganica Chimica Acta 85-89 (1993) (Year: 1993).*
Maria-Gabriela Alexandru et al: "Two-Dimensional Coordination Polymers Constructed by [Ni II Ln III] Nodes and [W IV (bpy) (CN) 6] 2-Spacers: A Network of [Ni II Dy III] Single Molecule Magnets", Inorganic Chemistry, vol. 52, No. 19, Oct. 7, 2013, pp. 11627-11637, XO055648925, Easton, US ISSN: 0020-1669, DOI: 10.1021/ic4019794.
Jung He Yoon et al: "Cyanide-Bridged W V-Co II Double-Zigzag Chain Based on an Octacoordinated W Precursor: Metamagnetism and Spin Canting", Inorganic Chemistry, vol. 46, No. 5, (Mar. 1, 2007), pp. 1529-1531, XP055648932, Easton, US ISSN: 0020-1669, DOI: 10.31021/ic062143d.
Jung He Yoon et al: "Cyanide-Bridged W(V)-Mn(II) Bimetallic Double-Zigzag Chains with a Metamagnetic Nature", Inorganic Chemistry, vol. 44, No. 22, (Oct. 1, 2005), pp. 7714-7716, XP05564835, Easton, US ISSN: 0020-1669, DOI: 10.1021/ic051415u.
Janus Szklarzewiez et al: "A novel cyano complex of tungsten (IV) with 2, 2'-bipyridyl", Transition Met. Chem, (Jan. 1, 1998), pp. 69-71, XP055648931, URL: https://link.springer.com/content/pdf/10.1007/BF01041503.pdf.

* cited by examiner

*Primary Examiner* — Alexander R Pagano
*Assistant Examiner* — Frank S. Hou
(74) *Attorney, Agent, or Firm* — Rivka Friedman

(57) ABSTRACT

A molecular magnetic material comprising salt molecules of a hexsacyanide tungsten anion complex of the formula: [WIV(CN)6(NN)]2-, a hexsacyanide tungsten anion complex of the formula: [WV(CN)6(NN)]—, wherein: W is a tungsten cation, CN is a cyano ligand, and NN is an NN-donating bidentate organic ligand forming a five-membered ring with the tungsten atom; and at least one type of a cation $[A]n+¬$, where n is an integer in the range of 1 to 4.

6 Claims, 5 Drawing Sheets

MOLECULAR MAGNETIC MATERIAL AND A METHOD FOR PREPARATION THEREOF

TECHNICAL FIELD

The present disclosure relates to a molecular magnetic material that has ferromagnetic properties in a wide range of temperatures, including temperatures close to 0° C., room temperatures and higher. The molecular magnetic material according to the invention undergoes photolysis, which means that the material upon irradiation with a light in 210-700 nm range undergoes decomposition and/or reduction, thereby losing its ferromagnetic properties. Consequently, the material is usable i.a. as a storage medium (memory).

BACKGROUND

Molecular magnetism defines a class of magnetic materials, which are based on molecular lattices, and therefore are different from continuous lattices of classical magnets. The technical field of molecular magnetism involves materials formed of a combination of organic material and inorganic metal ions or clusters—this type of materials are referred to as organic-inorganic materials.

For organic-inorganic materials, the molecular blocks (bricks) bear unpaired electrons, which are located in d-orbitals or f-orbitals, involving transition or lanthanide metal ions. These unpaired electrons, depending on their mutual arrangement within the material (which can be either parallel or antiparallel), define the magnetic properties—which may be ferromagnetic, ferrimagnetic or antiferromagnetic.

The molecular magnetic materials are designed as arrangements which are self-assembled from organic blocks (organic ligands) and inorganic blocks (metallic centers that may carry a magnetic moment). These arrangements may be either one dimensional (1D)—chains, two dimensional (2D)—layers, or three dimensional (3D)-networks. FIGS. 1A-1C illustrate schematically the molecular approach to three possible arrangements of the organic-inorganic molecular magnetic networks. The organic molecules (organic molecular blocks) are represented by rectangles, and inorganic ions or clusters (inorganic molecular blocks) are represented by spheres, whereas the arrows indicate spin-bearing blocks. As shown in FIGS. 1A and 1B, the unpaired electron spins may be carried by either organic or inorganic blocks, whereas in FIG. 1C the unpaired electron spins are carried by both organic and inorganic blocks. Within the ferromagnetic material, respective blocks are joined resulting in the antiparallel arrangement of the unpaired electron spins.

Ferromagnets become paramagnetic above the Curie temperature (Tc), which is also referred to as their critical temperature. Among the molecular magnetic materials, there are only a few with a reasonably high Curie temperature, whereas the vast majority of these materials exhibit a low Curie temperature (Tc). This makes the known molecular magnetic materials non-usable as ferromagnets in higher temperatures, such as room temperature.

One of the challenges in the self-assembly of molecular organic-inorganic magnets is the controlled spontaneous generation of well-defined architectures from both organic and inorganic building-blocks (bricks). Typically, a high structural organization is obtained by multiple one-binding to three-binding transition metals that give rise to a variety of extended networks. The organic bricks, which are ligands and the properly selected metal ions (the inorganic blocks) together assemble the networks by creating the chemical bonds. Therefore, the ligands are selected based on their bis-chelating coordinating ability, which can give versatile choices for interconnecting different spin-bearing metal ions, in the extended networks.

The oxolato (Ox) ligand, e.g. Ox-$CH_2$—$CH_2$—$CH_2$—Ox, incorporating two interconnected oxolato-units, is known to be used in self-assembly molecular magnetic networks of the general formula $[Mn^{II}(Ox\text{-}CH_2\text{—}CH_2\text{—}CH_2\text{—}O_x)Cu^{II}(Solvent)_x]_n$. Compounds of this type exhibit antiferrimagnetic ordering at low temperatures. Additionally, some of these compounds behave as metamagnets, where a small magnetic field applied induces a long-range ferromagnetic-like ordering by compensating the rather weak interaction between the 1D chains. In order to increase the magnitude of the magnetic ordering, the Ox-ligands are equally used in achieving 2D (spatial) arrangement of spin-bearing metal-ions, in which the building blocks $[M^{II}M^{III}(Ox)_3]^{1-}$ and $[M^{II}(Ox\text{-}CH_2\text{—}CH_2\text{—}CH_2\text{-}Ox)_3Cu^{II}_3]^{2-}$, with M—transition or lanthanide metals, are ordered in 2D sheet-like architectures, whereby the negative charge is counterbalanced by positive cations K. In these closed planar D2 salt structures, the cations K are mainly located between the anionic honeycomb layers and the systematic variation of K is used to modulate the separation between the layers and hence the interlayer magnetic interaction.

These 2D polymeric magnetic materials exhibit a wide range of magnetic behavior, including ferromagnetic properties with a relatively low critical (Curie) temperature Tc ranging from 5 to 44 K. It is indicated that the magnetic ordering of $[A][M^{II}M^{III}(Ox)_3]$ is strongly dependent on the character of cations: $A^+$ as well as the combination of $M^{II}$ and $M^{III}$ metal ions.

The cyano ligands are another group of widely used organic building blocks in self-assembly molecular magnetic materials. The magnetic bimetallic polycyano compounds are based on the linear bidentate binding mode of the cyano-bridging ligand (CN) and on the six-fold connectivity of the $B^{II}$ $(CN)_6$ brick (with B=first-row transition metal), which together with octahedral coordinating metal ions $A^{II}$ results in an overall infinite cubic crystal lattice. The use of $A^{iii}$ metal ions leads to a cubic negatively charged network structure $\{A^{III}_p[B^{II}(CN)_6]_q\}^{1-}$ in which the electroneutrality is kept by the introduction of monovalent alkali ions ($Na^+$, $K^+$, $Rb^+$, $Cs^+$) at interstitial lattice positions. The cubic A-CN-B matrix offers a variety to develop the orbital interactions in the three spatial directions by choosing very different paramagnetic anions: A and B. The high symmetry of the system allows efficient control of nature and the amplitude of the magnetic exchange interactions between the metal ions.

Among the metallic polycyano magnetic materials, the compound of mixed valence A=$Fe^{III}$ and B=$Fe^{II}$ exhibits relatively long-range ferromagnetic ordering at Tc=5.6 K. It is believed that the magnetic interactions occur between the next-nearest ions through $Fe^{III}$—CN—$Fe^{II}$—NC—$Fe^{III}$ linkages over a distance of 10.6 Å. The propagating magnetic interactions through widely separated spin carriers in molecular compounds are mainly due to the strong spin delocalization from the metal ions towards its nearest neighbors. The presence of strong spin densities on the nitrogen and carbon atoms of the cyano groups has been observed by the polarized neutron diffraction.

Nonetheless, depending on A and B, one may obtain 3D antimagnets and ferromagnets or ferrimagnets. For example, the ferrimagnet $Cr^{II}_3[Cr^{III}(CN)_6]_2 \cdot 10\ H_2O$ exhibits a critical temperature ($T_C$) of 230 K.

Furthermore, photo-induced magnetization phenomena in a powder sample of the stoichiometry of $K_{0.2}Co_{1.4}Fe(CN)_6 \cdot 6.9$ $H_2O$ has been detected. The magnetization and Tc value of this compound are significantly increased by red light illumination and the enhanced magnetization is partly reduced by blue light illumination.

The magnetic molecular materials exhibiting ferromagnetism with relatively high Curie temperature (Tc) are especially suitable in magnetic storage, quantum computing and molecular spintronic applications.

Therefore, many attempts have been taken to design self-assembly molecular magnet materials of a relatively high Curie temperature (Tc), so as to exploit their ferromagnetic properties at room conditions.

For example, a patent publication JP2012097050 describes octacyano metal complex which exhibits magnetic properties. The octacyano metal complex is composed of Co[W(CN)](pyrimidine) (4-methylpyridine)]-6H$_2$O, and it changes phase from a paramagnetic state to a ferromagnetic state by light irradiation.

There are also known other tungsten ion complexes comprising a different number of cyano ligands, such as hexacyano ion complexes.

For example, a publication of J. Szklarzewicz and A. Samotus: "A novel cyano complex of tungsten(IV) with 2,2'-bipyridyl" (Transition Met. Chem., 13, 69-71 (1988)), describes a complex compound of tungsten (IV) with 2, 2'-bipyridyl (bpy): $[W(bpy)(CN)_6]^{2-}$ and a method of synthesis thereof. The synthesis method enables to obtain salts of the aforementioned tungsten (IV) complexes either Bis (tetraphenylphosphonium)(2,2'-bipyridyl)hexacyanotungstate(IV)-tetrahydrate, $[Ph_4P]_2[W(bpy)(CN)_6] \cdot 4H_2O$ or Bis (tetraphenylarsonium)(2,2'-bipyridyl) hexacyanotungstate (IV)pentahydrate, $[Ph_4As]_2[W(bpy)(CN)_6] \cdot 5H_2O$. The chemical behavior of the aforementioned salts were investigated. The salts were soluble in water and in polar organic solvents such as MeOH, EtOH, MeCN and DMSO, ranging from purple (in $H_2O$) to blue (in alcohols) and green (DMSO) colors. They appeared to be stable in solutions for a longer time, at daylight and ambient temperature. The complex anions of $[W(bpy)(CN)_6]^{2-}$ were sable in aqueous solutions, even in relatively acidic solutions (up to 9 molar acid).

A publication of J. Szklarzewicz: "New cyano complex of W(V), $(Ph_4As)[W(bpy)(CN)_6]$: reversible redox system $[W(bpy)(CN)_6]^-/[W(bpy)(CN)_6]^{2-}$" (Inorganica Chimica Acta, 205 (1993) 85-89), describes a method for oxidation of $[W(bpy)(CN)_6]^{2-}$ to $[W(bpy)(CN)_6]^-$ with $KMnO_4$. The described redox system has a formal redox potential of $E^0=0.845V$. The described oxidation product is light sensitive and thermally stable. Furthermore, the described reaction product is either ion complex of W(IV) (as the reduction product) or ion complex of W(V) (as the oxidation product). Therefore, this publication does not mention the mixture of ion complexes of W(IV) and W(V). This is explicit from the described synthesis method, due to the use the oxidant ($KMnO_4$) in excess.

A publication of B. Sieklucka, J. Szklarzewicz and A. Samotus: "Photoreactivity of the (2,2'-bipirydyl)hexacyanotungstate (IV) ion in aqueous solution" (J. Photochem. Photobiol. A: Chem, 70 (1993) 35-38), describes an ion complex of tungsten (IV). The complex exhibits intense metal-to-ligand charge transfer (MLCT) bonds in the visible part of the spectrum and any ligand field (LF) bands are spectrally hidden.

Nonetheless, none of the cited above literature either explicitly or implicitly mentions magnetic, and especially ferromagnetic properties of the hexacyanide ion complexes of tungsten.

Furthermore, a publication MARIA-GABRIELA ALEXANDRU ET AL: "*Two-Dimensional Coordination Polymers Constructed by [Ni II Ln III] Nodes and [W IV (bpy)(CN) 6] 2-Spacers: A Network of [Ni II Dy III] Single Molecule Magnets*", INORGANIC CHEMISTRY, vol. 52, no. 19, DOI: 10.1021/ic4019794 describes a molecular magnetic material of SMM type (Single Molecule Magnet). The material is a coordination polymer of 2D structure and general formula of $\{[Ni^{(II)}(valpn)Ln^{(III)}(NO_3)(H_2O)(\mu-NC)4W^{(IV)}(bipy)(CN)_2] \cdot xH_2O \cdot yCH_3CN\}_n$. The polymer comprises only a diamagnetic tungsten: $W^{IV}$. The magnetic susceptibility of the material was measured in the temperature range 1.9-300 K, which is a standard approach using SQUID apparatus. The obtained results, shown in FIG. 6S of the publication, revealed the ferromagnetic properties of the material only below the temperature of 8K, whereas at higher temperatures the polymer exhibits only paramagnetic properties. Thereby the described compound is not a high-temperature ferromagnetic material. Furthermore, the document deliberates only a ferromagnetic interaction between $Ni^{II}$ and $Ln^{III}$.

Moreover, a publication JUNG HEE YOON ET AL: "*Cyanide-Bridged W V—Co II Double-Zigzag Chain Based on an Octacoordinated W Precursor: Metamagnetism and Spin Canting*", INORGANIC CHEMISTRY, vol. 46, no. 5, 1 Mar. 2007 (2007-03-01), DOI: 10.1021/ic062143d describes a 1D magnetic material comprising $[W^V(CN)_6 (bpy)]^-$, thus, comprising paramagnetic tungsten: $W^V$. The material exhibits ferromagnetic properties only below 8K (as shown on page 1530, FIG. 2 of the document). The document deliberates magnetic interactions between $W^V$ and $Co^{II}$ further assigning to $Co^{II}$ a local magnetic anisotropy. The described material is paramagnetic above 20.7K, thereby, constituting a ferromagnet only at the temperatures close to OK.

Further, JUNG HEE YOON ET AL: "*Cyanide-Bridged W(V)-Mn(II) Bimetallic Double-Zigzag Chains with a Metamagnetic Nature*", INORGANIC CHEMISTRY, vol. 44, no. 22, DOI: 10.1021/ic051415u describes the magnetic material comprising paramagnetic tungsten: $W^V$ bridged to $Mn^{II}$ via CN moieties. The synthesis method, described in this document, clearly states that only the product comprising purely paramagnetic tungsten $W^V$ is desirable. Therefore, this document teaches away from the addition of diamagnetic $W^{IV}$ to the material, stating that the presence of $W^{IV}$ is an impurity and describing how to avoid the impurity: page 7715 "( . . . )$[W(CN)_6(bpy)]^-$:$Mn^{2+}$=2:1 afforded 1( . . . ) the ratio of the reactants seems to play a role ( . . . )". The document deliberates the magnetic interactions between $W^V$ ($S_W=\frac{1}{2}$) and $Mn^{II}$ ($S_{Mn}=5/2$), explaining that the magnetic orbital on $W^V$ can be delocalized which matches well in symmetry with the orbitals on $Mn^{II}$, so that dominant antiferromagnetic interactions become realized. The described material is paramagnetic above 21.5 K.

As follows from the above, none of the prior art literature, explicitly or implicitly, indicates to combine dia- and paramagnetic tungsten: $W^{IV}$ and $W^V$, within a single material, in order to provide an improvement in the ferromagnetic properties, and in particular to obtain a high-temperature ferromagnetic material (above 200K). It should be underlined that neither of the documents describes the material of ferromagnetic properties at the temperature that is higher than c.a. 30K, which is confirmed by the magnetic data presented in these documents.

Furthermore, each of the above-cited prior art document, describing the material either comprising $W^{IV}$ or $W^V$ (but not both together), represents the approach in which an important factor, leading to the obtainment of certain magnetic interactions in the material, lies within the proper selection of metal cation, $Mn^{II}$ or $Co^{II}$—in the material with $W^V$, or $Ni^{II}$ with $Ln^{III}$-in the material with $W^{IV}$. Namely, $Mn^{II}$ $Co^{II}$ and $W^V$ are paramagnetic. $Mn^{II}$ possesses $d^5$ configuration of valence electrons, and $Co^{II}$ possesses $d^7$ configuration of valence electrons, thus the obtained magnetic properties of the created materials are related to the selection of two paramagnetic centers. Also, the magnetic moment of $Ni^{II}$ and lanthanides ($Ln^{II}$) reflects the magnetic moment of $W^V$ with one unpaired electron, and this leads to the magnetic properties of the material with $Ni^{II}$-$Ln^{III}$-$W^{IV}$. In detail, Ni possesses 2 or 0 unpaired electrons, depending on its symmetry in the material structure.

Furthermore, in all the above-described magnetic materials, the molecular systems (structures) are generated so that the cyanide (CN) moieties are bridged to Ni, Mn, or Co respectively, and this changes the force of interaction between ligands and the central atom. Therefore, it is very difficult (or impossible) to estimate whether the obtained structures (central atom-ligands) will behave as low- or high-spin systems. Further, it is difficult to predict the final symmetry of the structure depending on the metal cation, and in other words: what else might be coordinated in such the system, in addition to the cyanide (CN) groups.

As a summary of the above, it should be noted that none of the above-cited prior-art documents suggests combining $W^{IV}$ and $W^V$ in one magnetic material. Moreover, the magnetic properties of the materials described in these documents do not constitute a promising starting point to implement, in a real experiment, such the combination, because the material, i.e. those of $W^{IV}$-ligands as well as those of $W^V$-ligands, exhibits only low-temperature ferromagnetic properties, i.e., at the temperatures close to 0 K. Furthermore, the mentioned documents only focus on implementation, into the material, a proper metal cation (Mn, Co, Ni, Ln) and they describe interactions of paramagnetic metal cations with pure tungsten atom either paramagnetic or diamagnetic, but not both.

Therefore, there is a continuous need to further develop self-assembled molecular magnetic materials to design a material exhibiting ferromagnetic properties in a wider temperature range, including both the room temperature and higher temperatures.

SUMMARY OF THE INVENTION

One aspect of the present disclosure is a molecular magnetic material comprising salt molecules of:
a hexsacyanide tungsten anion complex of the formula: $[W^{IV}(C_N)_6(NN)]^{2-}$,
a hexsacyanide tungsten anion complex of the formula: $[W^V(CN)_6(NN)]^-$,
wherein: W is a tungsten cation, CN is a cyano ligand, and NN is an NN-donating bidentate organic ligand forming a five-membered ring with the tungsten atom; and at least one type of a cation $[A]^{n+}$, where n is an integer in the range of 1 to 4.

Preferably, the molecular magnetic material according to claim 1, wherein the NN-donating bidentate organic ligand is of the following formula:

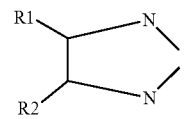

where: R1- and R2- are separate moieties, which are independently selected from the group consisting of unsaturated aliphatic hydrocarbons, saturated aliphatic hydrocarbons and hydrocarbons comprising heteroatoms. For example, the aliphatic hydrocarbons may be saturated with at least one substituent selected from the group consisting of —H, —$CH_3$, —$C_2H_5$ or —Ph.

Further, preferably the NN-donating bidentate organic ligand is of the following formula:

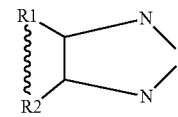

where: the moiety —(R1~R2)- is selected from the group consisting of alicyclic hydrocarbon substituent and aromatic hydrocarbon substituent.

Preferably, the NN-donating bidentate organic ligand is selected from the group consisting of 2,2'-bipyridine (bpy) and 1,10-phenanthroline (phen).

Preferably, the molecular magnetic material comprises at least traces of the hexsacyanide tungsten anion complex of the formula: $[W^{IV}(CN)_6(NN)]^{2-}$.

Preferably, the molecular magnetic material comprises at least traces of the hexsacyanide tungsten anion complex of the formula: $[W^V(CN)_6(NN)]^-$.

Preferably, the ratio of $[W^{IV}(CN)_6(NN)]^{2-}:[W^V(CN)_6(NN)]^-$ is from 1:9 to 9:1.

Preferably, the ratio of $[W^{IV}(CN)_6(NN)]^{2-}:[W^V(CN)_6(NN)]^-$ is 1:9.

Preferably, the cation $[A]^{n+}$ is selected from the group consisting of $Mn^{2+}$, $Fe^{2+}$, $Fe^{3+}$, $Co^{2+}$, $Ni^{2+}$, $Ag^+$, $Zn^{2+}$, $Cd^{2+}$, $Hg^{2+}$, $Tl^{2+}$, $Pb^{2+}$, $Cu^{2+}$, $Ce^{3+}$, $Ce^{4+}$, $Nd^{3+}$, $La^{3+}$, $Pr^{3+}$, $Sm^{3+}$, $Dg^{3+}$, $Tb^{3+}$, $Dy^{3+}$, $Er^{3+}$, $Ho^{3+}$, $Yb^{3+}$, $Eu^{3+}$, $H^+$, $Na^+$, $K^+$, $Rb^+$, $Cs^+$, $Pb(bpy)^{2+}$, $Pb(bpy)_2^{2+}$, $Cd(bpy)^{2+}$, $Cd(bpy)_2^{2+}$, $Zn(bpy)^{2+}$, and $Pb(NO_3)(H_2O)^+$.

Preferably, the molecular magnetic material comprises the salt molecules of the following general formula: $A_x[W(CN)_6(NN)]$, where x ranges: from 1 to 2, for the cation $[A]^+$, or from 0.5-1, for the cation $[A]^{2+}$ or from 0.33 to 0.66 for the cation $[A]^{3+}$ or from 0.25 to 0.5. for the cation $[A]^{4+}$.

A further aspect of the present disclosure is a method for preparing a molecular magnetic material, the method comprising the steps of providing a mixture of a hexacyanide tungsten anion complex of the formula $[W^{IV}(CN)_6(NN)]^{2-}$ and a hexacyanide tungsten anion complex of the formula $[W^V(CN)_6(NN)]^-$, wherein: W is a tungsten cation, CN is a cyano ligand, and NN is an NN-donating bidentate organic ligand forming a five-membered ring with the tungsten atom; and adding to said mixture at least one type of cation $[A]^{n+}$, where n is an integer in the range of 1 to 4 in order to form salt molecules comprising both anion complexes: $[W^{IV}(CN)_6(NN)]^{2-}$ and $[W^V(CN)_6(NN)]^-$ and the added cation $[A]^{n+}$.

Preferably, the mixture of $[W^{IV}(CN)_6(NN)]^{2-}$ and $[W^V(CN)_6(NN)]^-$ is prepared by incomplete oxidation of $[W^{IV}(CN)_6(NN)]^{2-}$ to $[W^V(CN)_6(NN)]^-$.

Preferably, the oxidation is carried out with at least one type of peroxide as the oxidizing agent.

Preferably, the peroxide is $H_2O_2$.

Preferably, the oxidation is carried out with at least one of the oxidizing agent selected from the group consisting of $KMnO_4$ and $Ce(NO_3)_4$.

Preferably, the oxidation is carried out by electrochemical oxidation of $[W^{IV}(CN)_6(NN)]^{2-}$ on platinum electrodes.

Preferably, the mixture of $[W^{IV}(CN)_6(NN)]^{2-}$ and $[W^V(CN)_6(NN)]^-$ is prepared by incomplete reduction of $[W^V(CN)_6(NN)]^-$ to $[W^{IV}(CN)_6(NN)]^{2-}$.

Preferably, the mixture of $[W^{IV}(CN)_6(NN)]^{2-}$ and $[W^V(CN)_6(NN)]^-$ is prepared by mixing the ion complex of the formula $[W^{IV}(CN)_6(NN)]^{2-}$ with ion complex of the formula $[W^V(CN)_6(NN)]^-$.

Preferably, the cation $[A]^{n+}$ is added to the mixture if the form of its salt.

Preferably the salt of cation $[A]^{n+}$ is selected from the group of consisting of $Cd(bpy)(NO_3)_2$, $Cd(NO_3)_2$, $Cd(NO_3)_2 \cdot 4H_2O$, $Zn(NO_3)_2$, $Zn(bpy)(NO_3)_2$, $ZnCl2$, $Pb(NO_3)_2$, $Cu(CH_3COO)_2$, $AgNO_3$, $Gd(NO_3)_3$, $Tb(NO_3)_3$, $ErCl_3$, and $Hg(NO_3)_2$.

Preferably, the mixture of $[W^{IV}(CN)_6(NN)]^{2-}$ and $[W^V(CN)_6(NN)]^-$ comprises at least one salt selected from the group consisting of $(PPh_4)_2[W(CN)_6(phen)]$, $(PPh_4)_2[W(CN)_6(bpy)]$, $(PPh_4)[W(CN)_6(bpy)]$, $(PPh_4)[W(CN)_6(phen)]$, $(AsPh_4)[W(CN)_6(phen)]$ and $(AsPh_4)[W(CN)_6(bpy)]$.

Preferably the formed salt molecules comprising anion complexes: $[W^{IV}(CN)_6(NN)]^{2-}$ and $[W^V(CN)_6(NN)]^-$ and the cations $[A]^{n+}$ are isolated from the reaction mixture by precipitation of the salt molecules or evaporation of solvent.

Yet another aspect of the present disclosure is the use of this magnetic material as a data storage medium.

BRIEF DESCRIPTION OF DRAWINGS

The present invention is shown by means of example embodiments on a drawing, wherein.

DETAILED DESCRIPTION

The present disclosure relates to a magnetic material that has ferromagnetic properties in a wide temperature range, from −50° C. (minus fifty degrees) to the Curie temperature which is ca. 350° C.

The magnetic material according to the present invention is a self-assembly molecular magnetic material comprising metallic polycyano compounds based on a linear bidentate binding mode of the cyan-bridging ligand (CN).

The molecular magnetic material comprises a salt structure comprising:

an anion, hexsacyanide tungsten ion complex of the formula: $[W^{IV}(C_N)_6(NN)]^{2-}$, an anion, hexsacyanide tungsten ion complex of the formula: $[W^V(CN)_6(NN)]^-$, wherein:
W is tungsten,
CN is a cyano ligand, and
NN is an NN-donating bidentate organic ligand forming a five-membered ring with tungsten atom; NN-donating bidentate organic ligand may be for example 2,2'-bipyridine (abbreviated as bpy) or 1,10-phenanthroline (abbreviated as phen), and at least one type of cation $[A]^{n+}$ for neutralizing the negative charge of the anions, wherein n=1-4.

Various cations $[A]^{+n}$ can be used to create the salt molecules of the magnetic material according to the present disclosure. To obtain the salt structure, either singe-atomic cation of small dimensions or multi-atomic cation of larger dimensions can be used. For example, at least one cation in the salt structure can be selected from the group consisting of: $Mn^{2+}$, $Fe^{2+}$, $Fe^{3+}$, $Co^{2+}$, $Ni^{2+}$, $Ag^+$, $Zn^{2+}$, $Cd^{2+}$, $Hg^{2+}$, $Tl^{2+}$, $Pb^{2+}$, $Cu^{2+}$, $Ce^{3+}$, $Ce^{4+}$, $Nd^{3+}$, $La^{3+}$, $Pr^{3+}$, $Sm^{3+}$, $Dg^{3+}$, $Tb^{3+}$, $Dy^{3+}$, $Er^{3+}$, $Ho^{3+}$, $Yb^{3+}$, $Eu^{3+}$, $H^+$, $Na^+$, $K^+$, $Rb^+$, $Cs^+$, $Pb(bpy)^{2+}$, $Pb(bpy)_2^{2+}$, $Cd(bpy)^{2+}$, $Cd(bpy)_2^{2+}$ and $Zn(bpy)^{2+}$.

Figure 2:
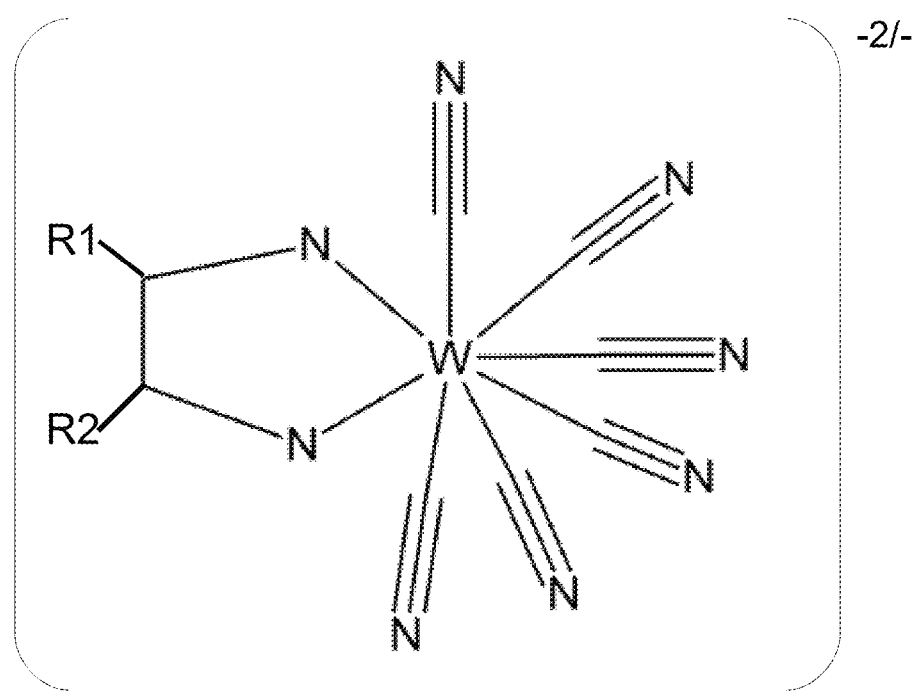
FIG. 2 shows a schematic structure of anions in salt structures of a magnetic material.

The schematic structure of the anions: $[W^{IV/V}(CN)_6(NN)]^{2-/-}$ comprised in the salt structures of the magnetic material are presented in FIG. 2. The anions are ion complexes with tungsten (W). In the ion complex of $[W(CN)_6(NN)]^{2-}$ tungsten is on fourth oxidation degree (W(IV)), whereas in the ion complex of $[W(CN)_6(NN)]^-$ tungsten in on fifth oxidation degree (W(V)). In both ion complexes, tungsten is coordinated with six cyano (CN) ligands and one NN-donating bidentate organic ligand forming a five-membered ring with tungsten (W) atom, with two nitrogen atoms bonded directly to tungsten atom and two carbon atoms connecting the nitrogen atoms in a ring. Shown in FIG. 2, the substituents R1- and R2- of the NN-donating bidentate organic ligand may constitute two separate moieties which may be of the same or different formula. The non-limiting examples of substituents R1- and R2- are selected from the group of hydrogen (H—) and aliphatic hydrocarbons, either saturated or unsaturated, optionally comprising heteroatoms such as S, N, O. In another embodiment the substituents R1- and R1- may be bonded to each other, thus constituting one bidentate substituent —(R1~R2)- forming one or more than one ring of alicyclic or aromatic nature. The non-limiting examples of NN-donating bidentate organic ligand comprising the substituent of formula —(R1~R2)- are 2,2'-bipyridine (bpy) and 1,10-phenanthroline (phen).

Preferably, in the molecular magnetic material, both anions $[W(CN)_6(NN)]^{2-}$ and $[W(CN)_6(NN)]^-$ comprise the same NN-donating bidentate organic ligand.

The anions $[W(CN)_6(NN)]^{2-}$ and $[W^V(CN)_6(NN)]^-$ together with the cation $[A]^{n+}$ create polycyano molecular magnetic materials of self-assembly nature that exhibits ferromagnetic properties in a wide temperature range, from −50° C. to their Curie temperature of ca. 350° C.

The matrix built-up from the tungsten ion complexes and cations $[A]^{n+}$ offers a variety to develop the d-orbital interactions in two directions of space. Therefore, the polycyano compounds comprising W(IV) and W(V) can create 2D-layered spatial architectures. This results from the presence of NN-donating bidentate organic ligand forming the five-membered ring with tungsten atom in both ion complexes $[W(CN)_6(NN)]^{2-}$ and $[W^V(CN)_6(NN)]^-$. The NN-donating bidentate organic ligand does not bond with the cations, as it is in the case of cyano ligands, thereby it blocks one direction in space, which prevents from formation of 3D networks. It is believed that the presence of NN-donating bidentate organic ligand in both ion complexes of W(IV) and W(V) within the polycyano molecular magnetic material provides the high-temperature ferromagnetic properties of the molecular magnetic material according to the present disclosure.

The ferromagnetic properties of the molecular magnetic material according to the present disclosure are exhibited by the material regardless the ratio of ion complexes $[W^{IV}(CN)_6(NN)]^{2-}:[W^V(CN)_6(NN)]^-$. Thus, the molecular magnetic material may comprise any amount of $[W(CN)_6(NN)]^{2-}$ and any amount of $[W^V(CN)_6(NN)]^-$ still showing ferromagnetic properties. For example, the molecular magnetic material may comprise from 0.01 to 99,99% of $[W^V(CN)_6(NN)]^-$ with regard to the total content of tungsten ion complexes $[W^{IV/V}(CN)_6(NN)]^{2-/-}$ comprised in the molecular magnetic material. However, the preferred ratio of $[W^{IV}(CN)_6(NN)]^{2-}:[W^V(CN)_6(NN)]^-$ of the molecular magnetic material is from 5:5 to 1:9, whereas the molecular magnetic material exhibits the most suitable ferromagnetic properties with the ratio of $[W^{IV}(CN)_6(NN)]^{2-}:[W^V(CN)_6(NN)]^-$ that is 1:9.

The molecular magnetic material comprises salt molecules with the structure depending on the used cation $[A]^{n+}$.

The salt molecules comprised in the molecular magnetic material are of the formulas: $A_x[W^{IV}(CN)_6(NN)]$ and $A_x[W^V(CN)_6(NN)]$ where stoichiometry of W(IV/W(V) can vary as described above. The anions and cations within the salt molecules are bonded by CN ligands, which forms bridges of $(-A-NC-W-CN-A-)_n$ type. These type of bonding in the bridges can be strong (as in case of d- and p-electron cations) or of only ionic or electrostatic origin (as in case of $Ln^{3+}$, alkali metal cations or $H^+$ ones).

Figure 4A:
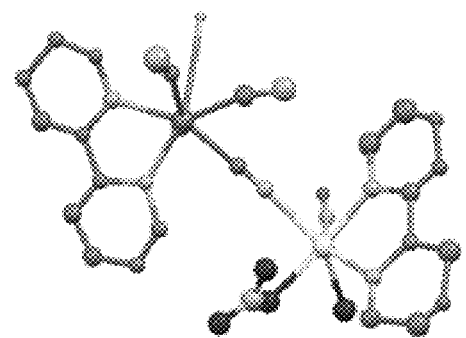
FIG. 4A shows an X-ray single crystal structure of isolated salt crystal with only W(V)
Figure 4B:
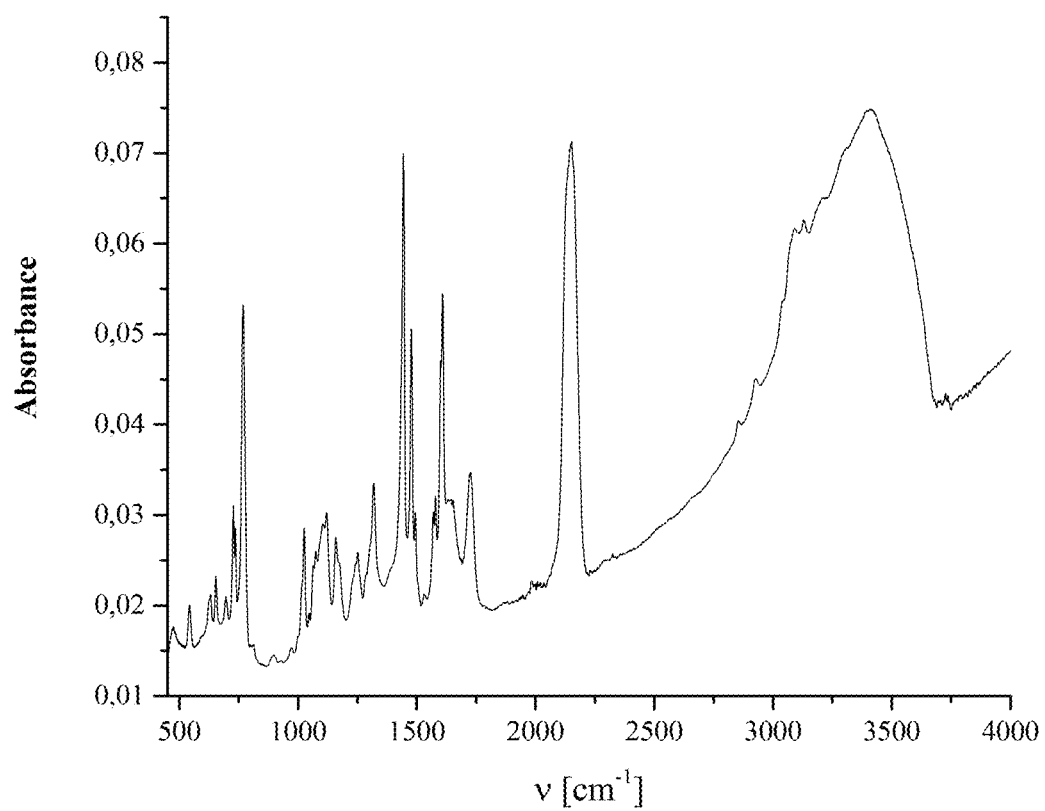
FIG. 4B shows an IR spectrum of an obtained ferromagnetic material.
Figure 4C:
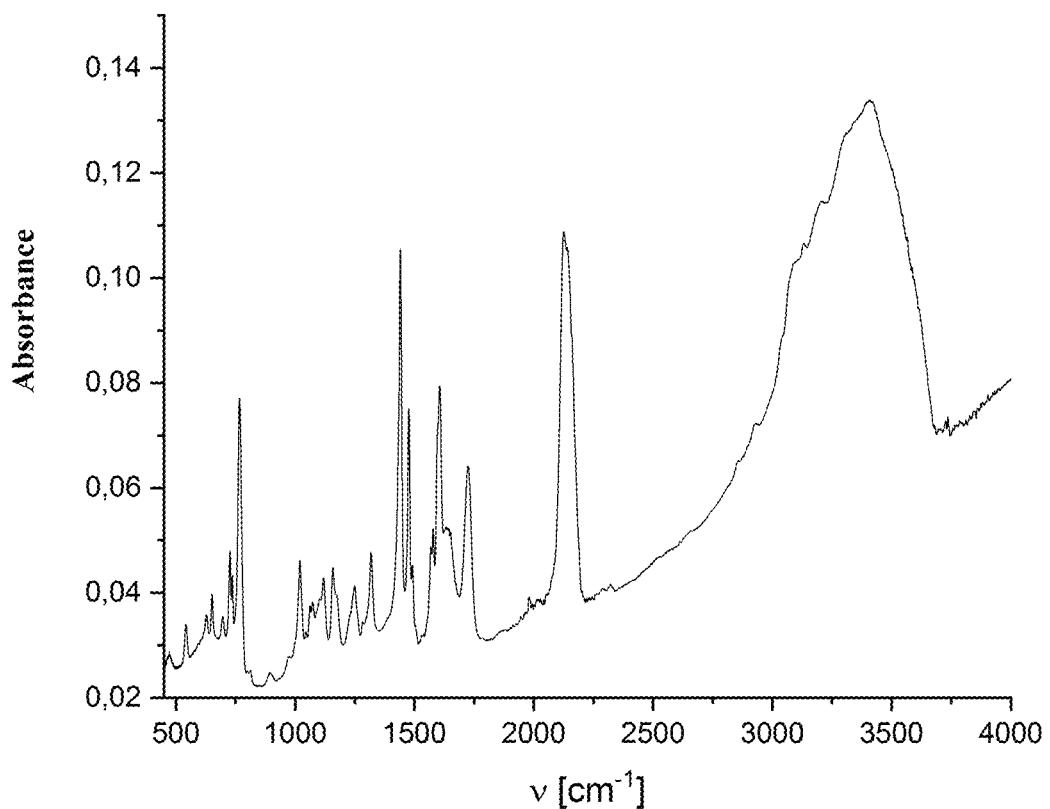
FIG. 4C shows an IR spectrum of an obtained ferromagnetic material.
Figure 4D:
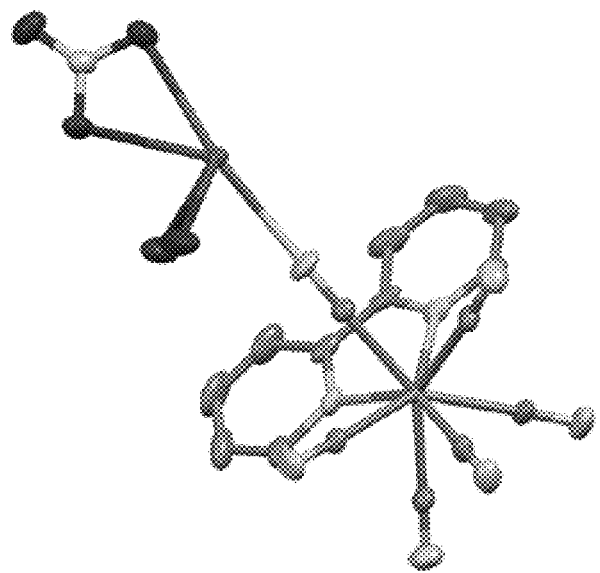
FIG. 4D shows an X-ray single crystal structure of isolated salt crystal with only W(V)
Figure 4E:
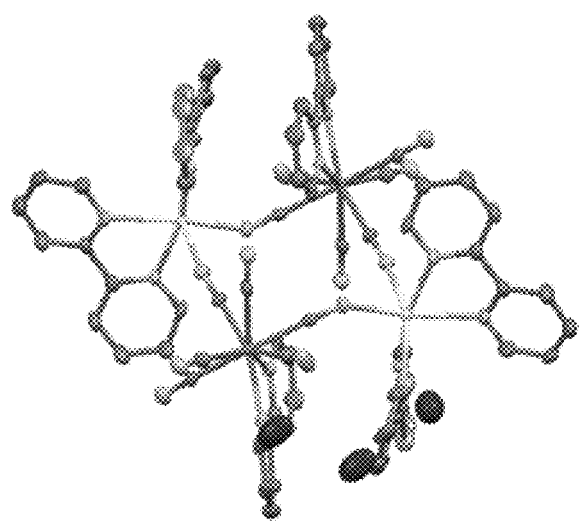
FIG. 4E shows an X-ray single crystal structure of the salt molecule.

Example embodiments of the salt molecules which may be comprised in the molecular magnetic material are schematically shown in FIGS. 4A, 4D and 4E, where FIG. 4A shows a salt molecule of the formula: $\{[Cd(NO_3)(H_2O)(bpy)][W(CN)_4(bpy)](\mu\text{-}CN)_2\}_n$, FIG. 4D shows a salt molecule of the formula: $\{[Pb(NO_3)(H_2O)][W(CN)_3(bpy)](\mu\text{-}CN)_3\}_n$, and FIG. 4E shows a salt molecule of the formula: $\{([Cd(bpy)_2][W(CN)_4(bpy)](\mu\text{-}CN)_2\}_2 \cdot 6H_2O$.

Figure 3A:
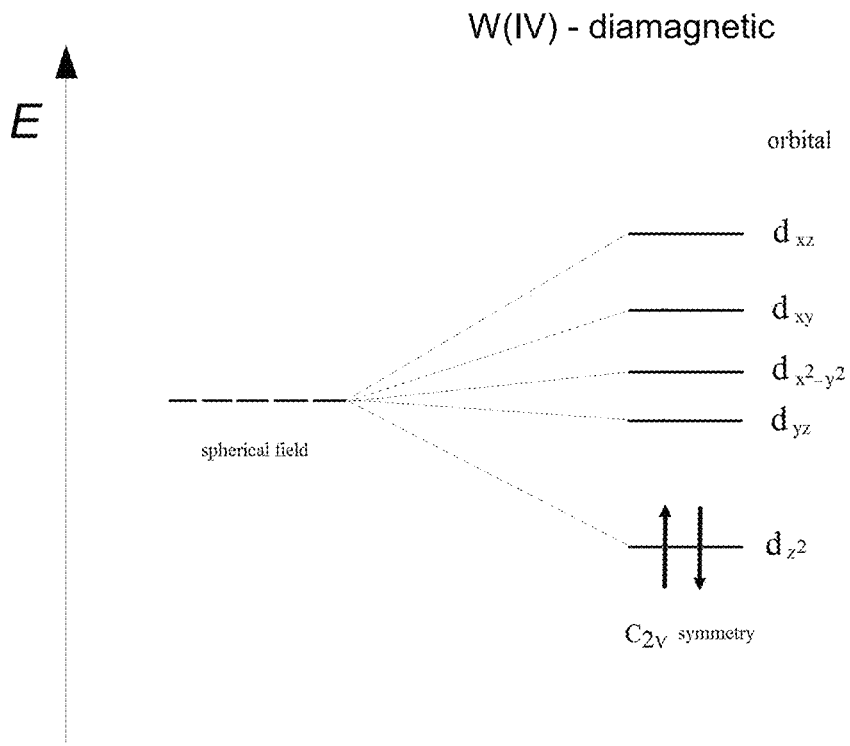
FIG. 3 shows schematically a non-symmetric orbital splitting of an embodiment of ion complexes.
Figure 3B:
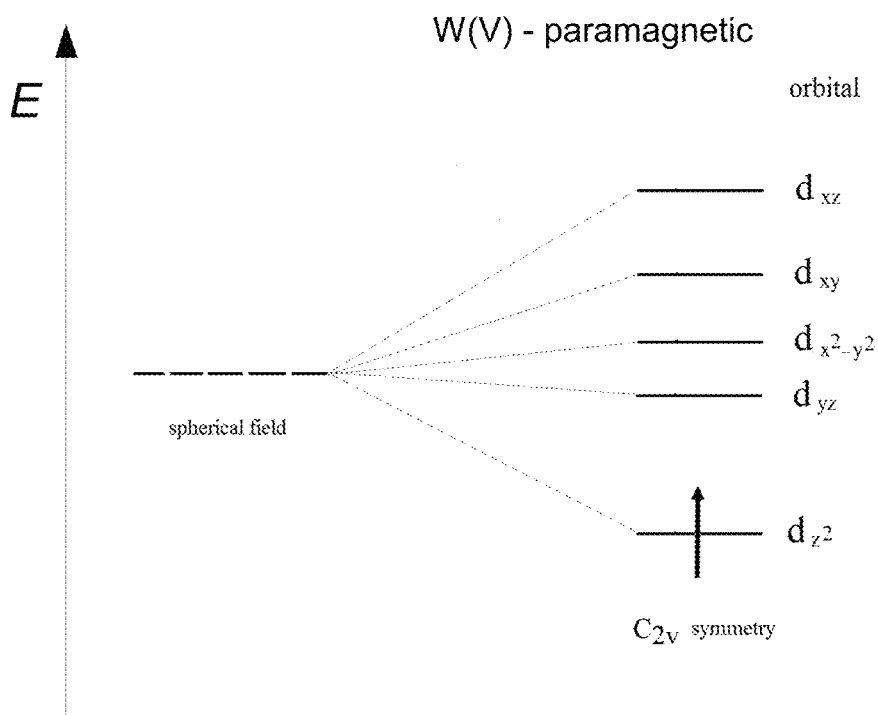

FIG. 3 shows schematically a non-symmetric orbital splitting of the embodiment of ion complexes: cyano complexes of tungsten(IV)/(V) with 2,2'-bipyridyl: $[W(CN)_6(bpy)]^{n-}$, where n=2 and 1, respectively. Both ion complexes lie in an octahedral geometry, symmetry $C_{2V}$. The ion complex: $[W(CN)_6(bpy)]^{2-}$ (with W(IV)) is diamagnetic (FIG. 3A), tungsten (IV) has two electrons of opposite spins occupying the energy level of $d_{z^2}$. To the contrary, the ion complex $[W(CN)_6(bpy)]^-$ (with W(V)) is paramagnetic—tungsten (V) has one unpaired electron occupying the energy level of $d_{z^2}$.

The same properties are exhibited by all of the ion complexes of the general formula of $[W(CN)_6(NN)]^{2-/-}$; the ion complex of tungsten (IV) is diamagnetic, and ion complex of tungsten (V) is paramagnetic.

Figures 1A, 1B, 1C:
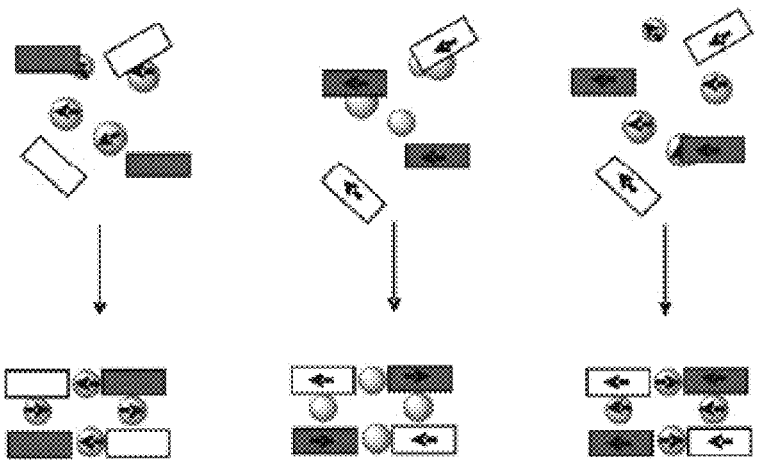
FIG. 1A shows one arrangement of organic-inorganic molecular magnetic networks (inorganic blocks)
FIG. 1B shows another arrangement of organic-inorganic molecular magnetic networks (organic blocks)
FIG. 1C shows another arrangement of organic-inorganic molecular magnetic networks (both organic and inorganic blocks)

It is believed that the ferromagnetic properties of the magnetic material according to the invention result from the combination of a diamagnetic complex of W(IV) and paramagnetic complex of W(V) in single molecular magnetic material. Presumably, diamagnetic tungsten (W(IV) in the ion complex of $[W(CN)_6(bpy)]^{2-}$ allows a distance separation of electron spins of W(V). Furthermore, during the solid salt formation (by precipitation or solvent evaporation) these certain structures of parallel unpaired spins are "frozen" (similar to FIG. 1), and this contributes to ferromagnetic properties of the created molecular magnetic material comprising the salt molecules. For liquid ferromagnetic materials ionic (or electrostatic) interactions result in temporary ferromagnetic arrangements responsible for magnetic properties of the solutions.

Therefore, the formation of ferromagnetic material is a result of the reaction between both ion complexes: $[W(CN)_6(bpy)]^{2-}$ and $[W(CN)_6(bpy)]^-$ with cations $[A]^{n+}$.

The molecular magnetic material may be in a solid form or in a dissolved form (a solution), still showing ferromagnetic properties. In the dissolved state, as long as the ion-ion interactions between the cations $[A]^{n+}$ and the anions of $[W(CN)_6(bpy)]^{2-}$ and $[W(CN)_6(bpy)]^-$ occur, the material exhibits ferromagnetic properties. Due to the dynamic equilibrium established in the solution, the ferromagnetic properties of the salt in the dissolved form may be described as non-permanent.

However, upon formation of the coordination bonds between the cations $[A]^{n+}$ and nitrogen in the cyano groups of anions: $[W(CN)_6(bpy)]^{2-}$ and $[W(CN)_6(bpy)]^-$, the observed ferromagnetic properties of the molecular magnetic material become permanent, and may be observed in a wide temperature range, including room temperature and higher temperatures, up to ca. 350° C. The formation of coordination bonds between cations $[A]^{n+}$ and anions of $[W(CN)_6(bpy)]^{2-/-}$ may be accomplished by using various methods, e.g. precipitation the salt from the solution or evaporation of solvent from the salt solution.

The obtained molecular magnetic material may be used in various applications, including magnetic materials useful as data storage of high memory capacity. It is also useful as memory storage in safety systems, which can be quickly and fully irreversibly erased of memory either by temperature increase or photolysis, or both. Furthermore, the magnetic material according to the present disclosure may be used in fast magnetic switches, super long solid magnets, magnetic paints or magnetic fluids.

The obtained salt materials, according to the present disclosure, exhibit significantly increased values of the magnetic moment $[\mu_B]$, expressed as magnetic moment per tungsten atom, compared to the expected values. This indicates the presence of long-range spin-spin interactions, within the material, which are assigned to the ferromagnetic materials. The increase in the magnetic moment per tungsten atom (i.e. tungsten center) is observed for the material according to the present disclosure at the temperatures above 220 K, and not below 50 K which is typical for described in the literature substances that do not comprise the ligands of $W^{IV}$ and $W^V$ in one material. It is supposed that the obtained effect is due to the creation of a parallel orientation of the electron spins within the material structure. It should be further noted that the obtained effect is only due to the presence of both tungsten ligands, i.e. those with diamagnetic and those with paramagnetic tungsten atom, and not to the certain selection of metal cation(s). The obtained effect of high-temperature ferromagnetism of the material according to the present disclosure is observed irrespective of the metal cation used. The used metal cation may be either paramagnetic such as Mn, or Co or diamagnetic such as, for example, Zn or Cd.

Table 1 collects the data of measured magnetic moment per tungsten atom [$\mu_B$] for the salt materials comprising different ratios of [W(CN)$_6$(bpy)]$^{2-}$ and [W(CN)$_6$(bpy)]$^-$, as well as different metal cations [A]$^{n+}$, including zinc (Zn), cadmium (Cd), nickel (Ni) and silver (Ag). Zn and Cd were selected for the measurement, because these cations are always diamagnetic, regardless of the obtained symmetry of the salt structure and the ligand type. Thus, for the embodiments of the salt material with Zn or Cd, the observed magnetic moment per tungsten atom, in theory (as it is known from the prior art) can derive only from the paramagnetic tungsten (W$^V$) possessing one unpaired electron per atom. Thus the obtained results are easily comparable.

The calculated (expected) magnetic moment for W$^V$ equals 1.73$\mu_B$ per atom, (i.e. calculated per tungsten (V) center). This value, for the known materials, is consistent with the experimental data. For example, for the materials comprising only W$^V$, the presence of diamagnetic Zn or Cd is expected to decrease the resultant magnetic moment [$\mu_B$] calculated per tungsten center. These theoretical considerations are confirmed by the experimental data. As shown in Table 1, the paramagnetic material of the general formula Zn$_x$[W(CN)$_6$(bpy)] where the ratio Zn:W(V)=5:8 (75% of W(V)), comprising only paramagnetic W$^V$ ligands: [W(CN)$_6$(bpy)]$^-$, and diamagnetic Zn$^{2+}$, has the measured magnetic moment of 1.30$\mu_B$ calculated per tungsten atom. Therefore the presence of the diamagnetic Zn, in the material comprising only W$^V$, clearly decreases the value of the measured magnetic moment calculated per tungsten atom (center). The same applies to the antiferromagnetic material of the general formula Zn$_x$[W$^V$(CN)$_6$(bpy)] where the ratio Zn:W(V)=21:40 (95% of W(V)) for which the measured value of the magnetic moment is 0.0$\mu_B$ per tungsten atom.

TABLE 1 values of magnetic moment calculated per tungsten (V) atom (i.e. number of W(V) centers) expressed in Bohr magnetrons [$\mu_B$], measured by SHERWOOD SCIENTIFIC magnetic susceptibility balance at 298 K

| Sample | Description | Magnetic moment [$\mu_B$] |
|---|---|---|
| Zn_W | Paramagnetic Zn$_x$[W(CN)$_6$(bpy)] comprising Zn:W(V) ratio = 5:8 [i.e. comprising 75% W(V)], synthesis similar to Example 4, but Zn salt was added at room temperature | 1.30 |
| Zn_W | Ferromagnetic Zn$_x$[W(CN)$_6$(bpy)] (low content of domains), 20% W(V), Zn:W 9:10, synthesis as in Example 4 | 2.14 |
| Zn_W | Ferromagnetic, synthesis as in Example 4, 80% W(V), Zn:W 3:5 | 8.73 |
| Zn_W | Ferromagnetic, synthesis as in Example 4, 80% W(V), Zn:W 3:5, the powder product was further separated into two parts by using a solid samarium magnet; measured was only the part of the powder that was attracted by the magnet | 12.1 |
| Zn_W | Ferromagnetic, synthesis as in Example 5, 80% W(V), Zn:W 3:5 | 8.00 |
| Zn_W | Antiferromagnetic Zn$_x$[W(CN)$_6$(bpy)] comprising Zn:W(V) ratio = 21:41 [95% of W(V)], synthesis similar to Example 4, with modification, by long heating (ca 30 minutes), of the mixture after addition of Zn | 0.0 |
| Cd_W | Paramagnetic Cd$_x$[W(CN)$_6$(bpy)] comprising Cd:W(V) ratio = 130:200, synthesis similar to Example 1, with modification: Cd added to the solution cooled to room temperature | 1.19 |

TABLE 1-continued values of magnetic moment calculated per tungsten (V) atom (i.e. number of W(V) centers) expressed in Bohr magnetrons [$\mu_B$], measured by SHERWOOD SCIENTIFIC magnetic susceptibility balance at 298 K

| Sample | Description | Magnetic moment [$\mu_B$] |
|---|---|---|
| Cd_W | Ferromagnetic, synthesis as in Example 2, conditions: heating time - 20 seconds at boiling temperature | 2.53 |
| Cd_W | Ferromagnetic, synthesis as in Example 3, conditions: heating time - 30 seconds at 90° C. | 4.67 |
| Cd_W | Ferromagnetic, synthesis as in Example 2, conditions: heating time - 90 seconds at 90° C. | 11.1 |
| Cd_W | Paramagnetic, synthesis as in Example 2, conditions: heating time 90 seconds at 25° C. | 1.39 |
| Ni_W | Ferromagnetic, synthesis similar to Example 4, conditions: Ni(NO$_3$)$_2$aq was used (instead of Zn salt), boiling time 180 seconds | 3.21 |
| Ni_W | Ferromagnetic, synthesis similar to Example 4, conditions: Ni(NO$_3$)$_2$aq was used (instead of Zn salt), boiling time 20 seconds | 4.68 |
| Ni_W | Ferromagnetic, synthesis similar to Example 4, conditions: Ni(NO$_3$)$_2$aq was used (instead of Zn salt) boiling time 40 seconds | 5.66 |
| Ni_W | Ferromagnetic, synthesis similar to Example 4, conditions: Ni(NO$_3$)$_2$aq was used (instead of Zn salt), boiling time 160 seconds | 4.05 |
| Ni_W | Ferromagnetic, synthesis similar to Example 4, conditions: Ni(NO$_3$)$_2$aq was used (instead of Zn salt), boiling time 50 seconds | 7.34 |
| Ni_W | Ferromagnetic, synthesis similar to Example 4, conditions: Ni(NO$_3$)$_2$aq (and not Zn salt), boiling time 90 seconds | 9.22 |
| Ag_W | Paramagnetic Ag$_x$[W(CN)$_6$(bpy)], synthesis as in Example. 10, conditions: heating time 10 seconds at boiling point | 1.34 |
| Ag_W | Ferromagnetic, synthesis as in Example 10, conditions: heating time 180 seconds at boiling point | 2.48 |

As follows from Table 1, for the salts based on Zn cations and comprising W$^V$- and W$^{IV}$-ligands according to the present disclosure, the highest obtained value of the magnetic moment is 12.1$\mu_B$ per tungsten atom. This value corresponds to the increase of gram magnetic susceptibility ($\chi_g$) by 300 times compared to those of the compound comprising only W$^V$. Such a high value of the magnetic moment calculated per tungsten center corresponds to the existence of about 11 unpaired electrons per tungsten atom within the salt material. It should be noted that the highest theoretical number of unpaired electrons per metal center is 7 (for gadolinium). Thereby, such high values of the magnetic moment (Table 1) obtained for the materials according to the present disclosure cannot be easily explained, but they clearly show that the high-temperature ferromagnetism is due to the presence of W$^V$ and W$^{IV}$ within the material, irrespectively of the magnetic character of metal cation used.

As further shown in Table 1, the analogous results are obtained for the ferromagnetic material with diamagnetic Cd with the highest measured value of the magnetic moment of 11.1$\mu_B$ per tungsten atom. The same applies to the salt material with Ag$^+$ and Ni$^{2+}$ comprised in the respective salt materials. One may notice that typical magnetic moments are observed for the material comprising only W$^V$ (described as paramagnetic or antiferromagnetic in Table 1), and a significant increase in the measured values of the magnetic moments is observed for the salt materials comprising W$^{IV}$ and W$^V$.

As already mentioned, the obtained high-temperature ferromagnetic properties of the salt material according to the present disclosure is related to the presence of both ligands $[W^{VI}(CN)_6(NN)]^{2-}$ and $[W^V(CN)_6(NN)]^-$ within the material, where the presence of diamagnetic cyano complex of $W^{IV}$ is responsible for the enhancement of magnetic properties when compared to the salt materials comprising only $[W^V(CN)_6(NN)]^-$. Thus, the salt material of the present disclosure can comprise only diamagnetic cations such as Zn(II), Cd(II), Pb(II), etc., still showing high-temperature ferromagnetic properties. As already discussed, in such embodiments of the salt material, the resultant value of the magnetic moment is due to the presence of $W^{IV}$ and $W^V$ centers, which directly indicates spin-spin interactions of ferromagnetic character within the material.

The obtained ferromagnetic properties of the salt material depend on experimental conditions such as W(IV)/W(V) ratio, temperature and time of reaction as these parameters influence the ratio of W(IV)/W(V) in the obtained product.

The method of synthesis the magnetic material involves a synthesis of salt of ion complex: $[W^{VI}(CN)_6(NN)]^{2-}$—further referred to as substrate 1, such as for example $(PPh_4)_2[W(CN)_6(bpy)]_{aq}$. The method of synthesis of the substrate 1 is known in the art, e.g. from J. Szklarzewicz and A. Samotus: "A novel cyano complex of tungsten(IV) with 2, 2r-bipyridyl" (Transition Met. Chem., 13, 69-71 (1988)) or J. Szklarzewicz: "New cyano complex of W(V), $(AsPh_4)[W(bpy)(CN)_6]$: reversible redox system $W(bpy)(CN)_6^-/W(bpy)(CN)_6^{2-}$" (Inorganica Chimica Acta, 205 (1993) 85-89).

Furthermore, another method of synthesis of substrate 1 may be used. For example, the ion complex $[W^{IV}(CN)_6(bpy)]^{2-}$ may be directly precipitated as a salt from the glycerin with the use of $PPh_4^+$ or $AsPh_4^+$ providing the substrate 1 being either $(PPh_4)_2[W^{IV}(CN)_6(bpy)]$ or $(AsPh_4)_2[W^{IV}(CN)_6(bpy)]$, respectively. In such a method, the respective salt of ion complex $[W^{IV}(CN)_6(NN)]^{2-}$ is isolated without forming a cadmium salt.

Next, the synthesized salt of ion complex $[W^{IV}(CN)_6(NN)]^{2-}$ being substrate 1 is subjected to the oxidation with the oxidizing agent, preferably $H_2O_2$, and more preferably in the form of 30% $H_2O_2$ aqueous solution. The use of $H_2O_2$ as the oxidizing agent provides the following advantage:— $H_2O_2$, during its reduction, introduces no external cations, or another by-product, into the reaction environment, thereby it does not produce impurities, (to the contrary, other oxidizing agents, may generate impurities during the reduction, e.g. $KMnO_4$ generates $Mn^{2+}$ ions whereas, $Ce(NO_3)_4$ generates $Ce^{3+}$ ions). Nonetheless, other oxidizing agents (other than $H_2O_2$), even those that generate external cations, may be used according to the present disclosure. In such the circumstances the obtained product of the oxidation reaction can be contaminated with external ions, and in some instances, it may require further purification. The examples of oxidizing agents which may be used as well according to the present disclosure are, for example, $KMnO_4$, Ce(IV) salts, peroxides, or W(IV) can be electrochemically oxidized on platinum electrodes. Nonetheless, $H_2O_2$ is preferable in order to obtain the product of high purity.

The oxidation reaction results in the mixture of $[W^{IV}(CN)_6(NN)]^{2-}$ and $[W^V(CN)_6(NN)]^-$ [as the reaction product. Therefore part of $W^{IV}(CN)_6(NN)]^{2-}$ is not oxidized. The degree of conversion of $[W^{IV}(CN)_6(NN)]^{2-}$ to $[W^V(CN)_6(NN)]^-$ provides a required ratio of $[W^{IV}(CN)_6(NN)]^{2-}$ to $[W^V(CN)_6(NN)]^-$ in the molecular magnetic material. The oxidation degree during the reaction may be controlled by the amount of the added oxidizing agent, reaction time (or electrochemical oxidation time) or temperature. Therefore, the temperature, is one of the means which enables one to control the oxidation degree, providing the desired ratio of $[W^{IV}(CN)_6(NN)]^{2-}$ to $[W^V(CN)_6(NN)]^-$. The obtained ratio of $[W^{IV}(CN)_6(NN)]^{2-}$ to $[W^V(CN)_6(NN)]^-$ further result in the number of the cations $[A]^{n+}$ necessary for neutralization of the negative charge of anions: $[W^{IV}(cN)_6(NN)]^{2-}$ and $[W^V(CN)_6(NN)]^-$, thereby forming salt molecules constituting the magnetic material according to the present disclosure of the general formula of $[A]_x[W(CN)6(NN)]$ in which x may vary depending on the quanity of ion molecules $[W^V(CN)_6(NN)]^-$ and $[W^{IV}(C_N)_6(NN)]^{2-}$.

Subsequently, a proper cation $[A]^{n+}$ is added to the reaction mixture. Preferably the cation $[A]^{n+}$ is added in the form of its salt, in order to obtain a required molecular magnetic material.

Depending on the reaction mixture conditions, such as pH and concentration of the respective ions, the molecular magnetic material may be precipitated upon addition of the cation salt $[A]^{n+}$, or the molecular magnetic material may be isolated from the reaction mixture by various known separation methods, for example by solvent evaporation.

Another method for synthesis of the molecular magnetic material according to the present disclosure involves the reduction of the ion complex with a reducing agent. In this method, ion complex $[W^V(CN)_6(NN)]^-$ is the starting reagent (another substrate 1).

Yet another method for synthesis of the molecular magnetic material according to the present disclosure consist in mixing ion complex of $[W^{IV}(CN)_6(NN)]^{2-}$ and ion complex of $[W^V(CN)_6(NN)]^-$ in the desired ratio followed by the addition of cation $[A]^{n+}$, preferably in the form of its salt. The obtained molecular magnetic material may be isolated from the reaction mixture by various methods, for example, those involving precipitation or evaporation.

Heating of the reaction mixture, during the preparation of the magnetic material, is preferable in the case of conducting oxidation or reduction reaction.

Nonetheless, it is not essential for carrying out the method according to the present disclosure. For example, when mixing of ions $[W^{IV}(CN)_6(NN)]^{2-}$ with $[W^V(CN)_6(NN)]^-$ is accomplished, there is no need for heating.

Furthermore, heating considerably accelerates the time of oxidation or reduction of respective ion complexes: either $[W^{IV}(CN)_6(NN)]^{2-}$ or $[W^V(CN)_6(NN)]^-$.

Nonetheless, without heating, the aforementioned reaction still can occur, with reduced reaction speed. Substantially, the reduction of the reaction temperature by each 10° C. provides twice reduction of the reaction speed. Therefore, for example, the reduction of the reaction temperature from the boiling point to the room temperature results in the reduction of reaction speed by ca. 530 times. Thus, the reaction can be conducted as well, at the room temperature. This may be advantageous, where longer reaction duration is required.

Example embodiments of the method for synthesis the molecular magnetic material are presented below:

EXAMPLE 1—synthesis of the ferromagnetic salt comprising cadmium cations (cadmium salt: $Cd(bpy)(NO_3)_2$ was used for precipitation of the magnetic material). 0.10 g of $(PPh_4)_2[W(CN)_6(bpy)]_{aq}$ was dissolved with 1 ml of acetonitrile. Next, 0.1 ml of 0.1 M $NaClO_4$ aqueous solution was added to the obtained mixture to obtain a product: $PPh_4ClO_4$. The product was filtered out, and the obtained filtrate was acidified to pH<7 using 6 drops of 0.1 M $HNO_3$. Subsequently, 0.5 ml of 30% $H_2O_2$ was added to the mixture, and then the mixture was heated till its boiling. After heating, an aqueous solution of 0.1 ml 1 M Cd(bpy)(NO$_3$)$_2$ was added to the mixture, and next it was cooled to the room temperature. Next, the reaction product: a solid salt was filtered out, then it was washed with water and acetone, and next the salt was dried in air. The X-ray single crystal structure of isolated salt crystal with mainly W(V) is shown in FIG. 4A. As only traces of W(IV) are present in the crystal, the disruption of the structure is not high, this results in relatively high R value (over 5%). Moreover, the X-ray structure cannot distinguish the oxidation state of the metal, it can be determined only roughly from the number of cations present in the structure, for traces of W(IV) and thus rather random distribution of additional cations this amorphous part cannot be seen in X-ray structure. As shown in FIG. 4A, the obtained salt molecules are an infinitive 1D polymer. Two cyano ligands of tungsten atom are involved in intramolecular interactions and only one ligand of tungsten atom is "free". The salt molecules obtained by precipitation of the tungsten complexes with Cd(bpy)(NO$_3$)$_2$ together constitute a magnetic material according to the present invention. The obtained molecular magnetic material exhibits ferromagnetic properties up to its thermal decomposition temperature of ca. 200° C.

EXAMPLE 2—synthesis of the ferromagnetic salt comprising cadmium cations (cadium salt: Cd(bpy)$_2$(NO$_3$)$_2$ was used for precipitation of the magnetic material). 0.1 g of (PPh$_4$)$_2$[W(CN)$_6$(bpy)]$_{aq}$ was dissolved in 1 ml of acetonitrile. Next, 0.1 ml of 0.1 M NaClO$_4$ aqueous solution was added to the obtained mixture to obtain a product: PPh$_4$ClO$_4$. The product was filtered out, and the obtained filtrate was acidified to pH<7 using 6 drops of 0.1 M HNO$_3$. Next, 0.5 ml of 30% H$_2$O$_2$ was added to the mixture, and then the mixture was heated till its boiling. Subsequently, the mixture was rapidly cooled to the room temperature, followed by addition 0.1 ml of 1 M aqueous solution of Cd(bpy)$_2$(NO$_3$)$_2$. The obtained product was filtered out, washed with water and acetone and dried in air. The obtained magnetic material has the general formula of [Cd(bpy)$_2$]$_x$[W(CN)$_6$(bpy)] where x vary between 0.5-1, depending on heating time (x=1 for 1 s and x=0.5 for 120 s at boiling temperature; at lower temperatures, from 20-100° C. time can be longer, even 5 min). The material consisted of the mixture of W(IV) and W(V) salt molecules having Cd(bpy)$_2^{2+}$ as cations.

EXAMPLE 3—synthesis of the ferromagnetic salt comprising cadmium cations (cadium salt: Cd(NO$_3$)$_2$ was used for precipitation of the magnetic material).

The glycerin solution (containing initially 2.0 g of (bpyH)$_3$H$_3$O[W(CN)$_8$]·H$_2$O in 15 ml of anhydrous glycerine) of [W(CN)$_6$(bpy)]$^{2-}$ was diluted twice with water and then acidified with 0.2 M HNO$_3$ up to pH<7. Subsequently, 1 ml of 30% H$_2$O$_2$ was added to the mixture, followed by heating the mixture till its boiling for ca. 5 minutes [ca. 99% conversion of W(IV) to W(V)]. Next, excess of solid Cd(NO$_3$)$_2$·4H$_2$O was added to the mixture, followed by its cooling to the room temperature. The obtained product was filtered out, washed with water and acetone, and next dried in air. The obtained product was magnetic material of the general formula of Cd$_x$[W(CN)$_6$(bpy)], where x varies between 0.5-1 depending on heating time (from 1 s for x=1, to 120 s, for x=0.5, at boiling temperature, respectively longer at lower temperatures, even up to 5 min.), whilst in this particular example x is closer to the value of 0,5. The obtained material contained the mixture of W(IV) and W(V) salt molecules with Cd$^{2+}$ as cations. The obtained product is ferromagnetic at room temperature (and is stable up to ca. 170° C.).

EXAMPLE 4—synthesis of the ferromagnetic salt comprising zinc cations (zinc salt: Zn(NO$_3$)$_2$ was used for precipitation of the magnetic material).

0.1 g of (PPh$_4$)$_2$[W(CN)$_6$(bpy)]$_{aq}$ was dissolved in 1 ml of MeCN (MeCN=acetonitrile). Next 0.1 ml of 0.1 M aqueous solution of NaClO$_4$ was added to the mixture. The PPh$_4$ClO$_4$ was filtered out, and the obtained filtrate was acidified with 6 drops of 0.1 M HNO$_3$. Subsequently, 0.5 ml of 30% H$_2$O$_2$ was added to the mixture followed by its boiling up to ca. 60% of conversion of W(IV) to W(V). Next, 0.1 ml of 1 M aqueous solution of Zn(NO$_3$)$_2$ was added. Next, the mixture was cooled to room temperature. Subsequently, the solid product was filtered out, washed with water, acetone (3 times) and dried in air. The obtained product was ferromagnetic material comprising salt molecules with anions of W(IV) and W(V) and Zn$^{2+}$ as cations. The general formula of the obtained material is Zn$_x$[W(CN)$_6$(bpy)], where x vary between 0.5-1 depending on heating time. In this example x is close to 0.7. The product is ferromagnetic at room temperature (and is stable to ca. 170° C.). FIG. 4B shows the IR spectrum of the product, in the range of 450-4000 cm$^{-1}$. The band at 2130 cm$^{-1}$ indicates the presence of CN ligands. The high intensity of this bands indicate presence of W(IV) (W(V) $\nu_{CN}$ bands are of low intensity), relatively high (2040-2200 cm$^{-1}$) width of this band indicates the cyanide ligands interactions, both through hydrogen bonds and via CN bridges formation. The small bands at 1514 cm$^{-1}$ and 1269 cm$^{-1}$ may indicate that traces of NO$_3^-$ are present in product. The bands in the 450-1600 cm$^{-1}$ come from bpy ligand. The presence of water of hydration is also observed (bands at 1640 and 3000-3600 cm$^{-1}$ range).

EXAMPLE 5—synthesis of the ferromagnetic salt comprising zinc cations (zinc salt: Zn(bpy)(NO$_3$)$_2$ was used for precipitation of the magnetic material).

0.1 g of (PPh$_4$)$_2$[W(CN)$_6$(bpy)]$_{aq}$ was dissolved in 1 ml of MeCN. Next, 0.1 ml of 0.1 M NaClO4 was added to the mixture. The obtained PPh$_4$ClO$_4$ was filtered out and the obtained filtrate was acidified with 0.1 M HNO$_3$ up to pH<7. Then 0.5 ml of 30% H$_2$O$_2$ was added to the mixture followed by heating of the mixture till its boiling. Next, 100 mg of 2,2'-bipyridine was added to the mixture where it dissolved. After the dissolving of 2,2'-bipyridine, 0.1 ml of 1 M aqueous solution of Zn(NO$_3$)$_2$ was added to the mixture followed by its cooling to the room temperature. Next, the obtained precipitate was filtered out, washed with water and acetone and dried in air. The obtained product was a ferromagnetic material composed of salt molecules comprising ion complexes of W(IV) and of W(V) as anions and Zn$^{2+}$ as cations. The general formula of the obtained material is [Zn(bpy)]$_x$[W(CN)$_6$(bpy)], where x vary between 0.5-1 depending on heating time [from 1 s for x=1 to 120 s for x=0.5 at 100° C., respectively longer for lower temperatures (up. to 5 min at room temperature)]. In this example, x is close to 0.75. The obtained material exhibits ferromagnetic properties at room temperature and is stable up to 150° C.

EXAMPLE 6—synthesis of the ferromagnetic salt comprising lead cations (lead salt: Pb(NO$_3$)$_2$ was used for precipitation of the magnetic material).

0.1 g of (PPh$_4$)$_2$[W(CN)$_6$(bpy)]$_{aq}$ was dissolved in 1 ml of MeCN (MeCN=acetonitrile). Next, 0.1 ml of 0.1 M aqueous solution of NaClO$_4$ was added to the mixture. The obtained product PPh$_4$ClO$_4$ was filtered out, and the received filtrate was acidified with 6 drops of 0.1 M HNO$_3$. Subsequently, 0.5 ml of 30% H$_2$O$_2$ was added followed by boiling of the mixture in order to converse a part of W(IV) into W(V) (the oxidation reaction yields less than 100%). Then 0.1 ml of 1

M aqueous solution of $Pb(NO_3)_2$ was added to the mixture. Next, the mixture was cooled to the room temperature, and the obtained precipitate was filtered out, washed with water and acetone and dried in air. The obtained product was a material composed of salt molecules comprising anions of W(IV) and W(V) and $Pb^{2+}$ as cations. The general formula of the obtained material is $Pb_x[W(CN)_6(bpy)]$, where x vary between 0.5-1 depending on heating time (from 1 to 120 s) and temperature (from room temperature to solvent boiling point) In this example, x is close to 0.5 (heating time ca. 30 s). The obtained material showed ferromagnetic properties at room temperature and it was stable up to 100° C.

EXAMPLE 7—synthesis of the ferromagnetic salt based on copper cations (copper salt: $Cu(CH_3COO)_2$ was used for precipitation of the magnetic material).

0.1 g of $(PPh_4)_2[W(CN)_6(bpy)]_{aq}$ was dissolved in 5 ml of MeCN. Next 50 mg of $Cu(CH_3COO)_2$ in 5 ml of EtOH was added to the mixture. The obtained precipitate was filtered out, washed with water and acetonitrile and dried in air. The obtained product was a ferromagnetic material of the general formula of $Cu_x[W(CN)_6(bpy)]$, where x is close to 1. The material comprised salt molecules with ion complexes of W(IV) and of W(V) as anions and $Cu^{2+}$ as cations. The salt shown ferromagnetic properties at room temperature and it wasstable up to 100° C.

EXAMPLE 8—synthesis of the ferromagnetic salt based on cadmium cations (cadmium salt: $Cd(NO_3)_2$ was used for precipitation of the magnetic material).

0.1 g of $(PPh_4)_2[W(CN)_6(bpy)]_{aq}$ was dissolved in 1 ml of MeCN (MeCN=acetonitrile). Next, 0.1 ml of 0.1 M aqueous solution of $NaClO_4$ was added to the mixture. The obtained product: $PPh_4ClO_4$ was filtered out, and the received filtrate was acidified with 6 drops of 0.1 M $HNO_3$. Subsequently, 0.5 ml of 30% $H_2O_2$ was added to the mixture followed by its boiling in period of 30 s to 5 minutes, preferably 2 minutes. Next, 0.1 ml of 1 M $Cd(NO_3)_2$ aqueous solution was added to the mixture followed by its cooling to the room temperature. The obtained precipitate was filtered out, washed with water and acetonitrile and dried in air. The obtained product was a ferromagnetic material composed of salt molecules comprising ion complexes of W(IV) and of W(V) as anions and $Cd^{2+}$ as cations. The general formula of the obtained material was $Cd_x[W(CN)_6(bpy)]$, where x vary between 0.5-1 depending on heating time. In this example x was close to 0.55. FIG. 4C shows the IR spectrum of the product, in the range of 450-4000 $cm^{-1}$. The band at 2130 $cm^{-1}$ indicates the presence of CN ligands, high intensity of this band indicates the presence of W(IV), whereas $v_{CN}$ bands of W(V) are of low intensity. A relatively big width of the band of 2040-2200 $cm^{-1}$ indicates that cyanide ligands interact both through hydrogen bonds and via CN bridges formation. The small bands at 1514 $cm^{-1}$ and 1269 $cm^{-1}$ may indicate that traces of $NO_3^-$ are present in product. The bands in the 450-1600 $cm^1$ come from bpy ligand. The presence of water of hydration is also observed (bands at 1640 and 3000-3600 $cm^{-1}$ range). The product shows ferromagnetic properties at room temperature and is stable up to 150° C.

EXAMPLE 9—synthesis of the ferromagnetic salt based on lead cations (lead salt: $Pb(NO_3)_2$ was used for precipitation of the magnetic material).

0.1 g of $(PPh_4)_2[W(CN)_6(bpy)]_{aq}$ was dissolved in the composition of 2 ml of MeCN and 1 ml of $H_2O$. The mixture was acidified with 0.1 M $HNO_3$. Next, 0.5 ml of 30% $H_2O_2$ was added to the mixture followed by heating of the mixture till its boiling (in period of 5 minutes). Then, 0.1 ml of 1 M $Pb(NO_3)_2$ aqueous solution was added to the mixture, and the mixture was cooled to the room temperature. The obtained precipitate was filtered out, washed with water and acetonitrile and dried in air. The obtained product was a ferromagnetic material comprising salt molecules composed of ion complexes of W(IV) and of W(V) as cations and $Pb^{2+}$ as cations. The general formula of the obtained material is $[Pb(NO_3)(H_2O)]_x[(CN)_6bpy]$ where x is close to 1, so the formula can be roughly formulated as: $\{[Pb(NO_3)(H_2O)][W(CN)_3(bpy)](\mu-CN)_3\}_n$, where $\mu$ means a bridging ligand. The X-ray single crystal structure of isolated salt crystal with mainly W(V) is shown in FIG. 4D. As only traces of W(IV) are present in crystal, the disruption of the structure is not high, this results in relatively high R value (over 5%). Moreover, the X-ray structure cannot distinguish the oxidation state of metal, which can be determined only roughly from number of cations present in structure, for traces of W(IV) and thus rather random distribution of additional cations this amorphous part cannot be seen in the structure. As shown in FIG. 4D, the obtained salt molecules is an infinitive 2D polymer. Three cyano ligands of tungsten atom are involved in intramolecular interactions and only one ligand of tungsten atom is "free".

The obtained salt shown ferromagnetic properties in room temperature and was stable up to ca. 120° C.

EXAMPLE 10—synthesis of the ferromagnetic salt based on silver cations (silver salt: $AgNO_3$ was used for precipitation of the magnetic material).

0.1 g of $(PPh_4)_2[W(CN)_6(bpy)]_{aq}$ was dissolved in the composition of 2 ml of MeCN and 1 ml of $H_2O$. Next, the mixture was acidified with 6 drops of 0.1 M $HNO_3$. Subsequently, 0.5 ml of 30% $H_2O_2$ was added to the mixture followed by heating of the mixture till its boiling (1 minutes of heating). Then 0.4 ml of 0.1 M $AgNO_3$ in MeCN was added to the mixture. The obtained precipitate was filtered out, washed with water and acetonitrile and dried in air. The obtained product was a ferromagnetic material comprising salt molecules with ion complexes of W(IV) and of W(V) as anions and $Ag^+$ as cations. The general formula of the obtained magnetic material is $Ag_x[W(CN)_6(bpy)]$, where x varies between 1 and 2 depending on heating time (from 1 s to 180 s at 100° C., respectively longer at lower temperatures), whereas in this example, x is close to 1.5. The salt shown ferromagnetic properties at room temperature and it was stable up to ca. 100° C. The obtained product is very sensitive to light.

EXAMPLE 11—synthesis of the ferromagnetic salt based on Ln(III): Gd(III), Er(III) and Tb(III) cations (the following salts were used for precipitation of the magnetic material: $Gd(NO_3)_3$, $Tb(NO_3)_3$, $ErCl_3$).

A mixture of 0.2 g of $(PPh_4)_2[W(CN)_6(bpy)]$ in water-methanol solvent (water:methanol 1:2, ca 20 ml) was passed through the ion-exchange resin in $H^+$ form. Formed $H_2[W(CN)_6(bpy)]$ was acidified additionally with 0.2 ml of 0.2 M $HNO_3$. Next, 4 drops of 30% $H_2O_2$ was added to the mixture. Subsequently, the mixture was boiled for a short time (30 s), and next the mixture was divided into 3 equal parts. Each part was treated with 40 mg of different precipitation agent, being either $Gd(NO_3)_{3aq}$ or $Tb(NO_3)_{3aq}$ or $ErCl_{3aq}$. The three mixtures were left up to total solvent evaporation, and the obtained solid products were collected to separate vials. The obtained products were the ferromagnetic materials comprising salt molecules composed of ion complexes of W(IV) and od W(V) as anions and $Ln^{3+}$ as cations. The general formula of the obtained three materials is $Ln_x[W(CN)_6(bpy)]$, where x vary between 0.33-0.66 depending on heating time (from 1 to 120 s), Ln denote Gd(III)—for first material, Tb(III)—for the second material, and Er(III)—for third material, wherein for each obtained product x is close to 0.5—in the described example. The salts shown ferromagnetic properties at room temperature and were stable up to ca. 120° C.

EXAMPLE 12—synthesis of the ferromagnetic salt based on mercury cations (mercury salt: $Hg(NO_3)_2$ was used for precipitation of the magnetic material).

A mixture of 0.1 g of $(PPh_4)_2[W(CN)_6(bpy)]$ in 2 ml of MeCN and 1 ml of $H_2O$, was acidified with 6 drops of 0.1 M $HNO_3$. Next, 0.5 ml of 30% $H_2O_2$ was added to the mixture followed by heating the mixture till its boiling (10 s). Subsequently, 0.1 ml of 1 M $Hg(NO_3)_2$ aqueous solution was added to the mixture, and the mixture was cooled to the room temperature and filtered. The obtained solid product was washed with water and acetone (three times) and dried in air. The obtained product, i.e. the ferromagnetic material comprising salt molecules with ion complexes of W(IV) and of W(V) as anions and $Hg^{2+}$ as cations. The general formula of the obtained material is $Hg_x[W(CN)_6(bpy)]$, where x varies between 0.5-1 depending on heating time (ranging from 1 to 120 s), in this example, x was close to 0.9. The obtained material has shown ferromagnetic properties at room temperature and was stable up to 100° C.

EXAMPLE 13—synthesis of the ferromagnetic salt based on zinc cations (zinc salt: $ZnCl_2$ was used for precipitation of the magnetic material).

0.1 g of $(PPh_4)[W(CN)_6(bpy)]$ was dissolved in 4 ml of MeCN. Next, 0.2 ml of 1 M solution of $ZnCl_2$ in MeCN was added to the mixture. Next, the mixture was heated till its boiling (1 minutes), and next the mixture cooled. Following the cooling process, the mixture was filtered out. The obtained solid product was washed three times with MeCN and dried in air. The yield was ca. 60%. The product contained only trace amount of W(V) due to reduction to W(IV) (during the procedure of synthesis) indicated by its light-orange color. The obtained product was a ferromagnetic material comprising salt molecules of anions W(IV) and W(V) and $Zn^{2+}$ cations. The general formula of the obtained material is $Zn_x[W(CN)_6(bpy)]$, where x vary between 0.5-1 depending on heating time (from 1 to 240 s), whereas in this example, x is close to 1.0. The salt shown ferromagnetic properties at room temperature and it was stable up to 150° C.

EXAMPLE 14—synthesis of the ferromagnetic salt based on lead cations (lead salt: $Pb(NO_3)_2$ was used for precipitation of the magnetic material).

0.2 ml of 1 M $Pb(NO_3)_2$ in MeCN was added to the solution of 0.1 g of $(AsPh_4)[W(CN)_6(bpy)]_{aq}$ in 4 ml of MeCN. The precipitated product was filtered out, washed with MeCN and dried in air. Reaction yield was ca. 40%. The product contained trace amount of W(IV) which was indicated by the product color. The obtained product was a ferromagnetic material composed of a mixture of ion complexes of W(IV) and of W(V) as anions with $Pb^{2+}$ as cations of general formula $[Pb(NO_3)]_x[W(CN)_6(bpy)]$, where x vary between 0.5-1 depending on whether the addition of W(IV) salt (and how much) was used in the synthesis.), in this embodiment x is close to 0.5. The obtained material shown ferromagnetic properties at room temperature and it was stable up to 130° C.

EXAMPLE 15—synthesis of the ferromagnetic salt based on cadmium cations ($Cd(NO_3)_2$ was used for precipitation of the magnetic material).

The solution of 0.1 g of $(PPh_4)[W(CN)_6(bpy)]$ in 4 ml of MeCN was mixed with 0.2 ml of the 1M solution of $Cd(NO_3)_2 \cdot 4H_2O$ in MeCN—separated by agar layer in a tube. The obtained mixture was left for 4 months. Next, almost colorless, fine powder was obtained as a reaction product. The obtained product was a ferromagnetic material comprising salt molecules with ion complexes of W(IV) and of W(V) as anions and $Cd^{2+}$ as cations. The general formula of the obtained product is $[Cd(bpy)_2]_x[W(CN)_6(bpy)]$, where x varies between 0.5-1 depending on the time of isolation of the crystals from the agar layer (from 1 week to 4 months). in this embodiment, x is close to 1 indicating almost pure W(IV) system, with traces of W(V) present in this system.

Next, a single violet crystal of pure salt with almost pure ion complex of W(IV), comprising traces of W(V), was isolated and this crystal structure was determined by single crystal X-ray diffraction. The structure is shown in FIG. 4E. The complex is a tetramer, with separated units. The crystal structure is stabilized by a net of hydrogen bonds and intermolecular interactions between tetrames. The general formula of complex can be presented as: $\{([Cd(bpy)_2][W(CN)_4(bpy)](\mu\text{-}CN)_2\}_2 \cdot 6H_2O$. The complex is ferromagnetic at room temperature and is thermally stable up to ca. 150° C.

EXAMPLE 16—synthesis of the ferromagnetic salt based on cadmium cations (hydrated cadmium salt: $Cd(NO_3)_2 \cdot 4H_2O$ was used for precipitation of the magnetic material).

40 mg of $(AsPh_4)[W(CN)_6(bpy)]$ was dissolved in water-acetonitrile solvent (2 ml water+2 ml acetonitrile). Next, the mixture was acidified with 0.2 ml of 0.2 M $HNO_3$. Then 0.1 ml of 0.1M solution of sorbitol was added to the mixture and heated to 60° C. by 30 seconds which resulted in the bright violet-red color of the mixture. Next, a solid $Cd(NO_3)_2 \cdot 4H_2O$ (ca. 30 mg) was added to the mixture. The obtained precipitated product was filtered out, washed with water and acetone and dried in air. The obtained product was a ferromagnetic material comprising salt molecules with ion complees of of W(IV) and of W(V) as anions and $Cd^{2+}$ as cations. The general general formula of the obtained material is $[Cd(NO_3)]_x[W(CN)_6(bpy)]$, where x vary between 1 and 2 depending on heating time (reaction time with sorbitol between 10-120 s), in this embodiment, x is close to 0.7 indicating a mixture of W(IV) and W(V). The obtained material shown ferromagnetic properties at room temperature and was stable up to ca. 110° C.

EXAMPLE 17—sytnesis of the ferromagnetic salt based on cadmium cations (hydrated cadmium salt: $Cd(NO_3)_2 \cdot 4H_2O$ was used for precipitation of the magnetic material).

The solution of 10 mg of $(PPh_4)_2[W(CN)_6(phen)]$ in 2 ml of acetonitrile was mixed with the solution of 5 mg of $(PPh_4)[W(CN)_6(phen)]$ in 2 ml of acetonitrile. Next, 20 mg of solid $Cd(NO_3)_2 \cdot 4H_2O$ was added to the mixture. The precipitated product was filtered out, washed with water and acetone and dried in air. The obtained product was a ferromagnetic material comprising salt molecules with ion complees of W(IV) and of W(V) as anions and $Cd^{2+}$ as cations. The general formula of the obtained material is $[Cd(NO_3)]_x[W(CN)_6(phen)]$, where x vary between 1 and 2 depending on stoichiometry of W(IV) to W(V) used in synthesis, in this embodiment, x is close to 1.6. The obtained material was ferromagnetic at room temperature and was stable up to ca. 100° C.

The invention claimed is:

1. A method for preparing a molecular magnetic material, the method comprising the steps of:
providing a mixture of a hexacyanide tungsten anion complex of a formula $[W^{IV}(CN)_6(NN)]^{2-}$ and a hexacyanide tungsten anion complex of a formula $[W^{V}(CN)_6(NN)]^{-}$, wherein:
W is a tungsten cation,
CN is a cyano ligand, and
NN is an NN-donating bidentate organic ligand forming a five-membered ring with the tungsten atom;

adding to said mixture at least one type of a cation $[A]^{n+}$, where n is an integer equal from 1 to 4, to form salt molecules comprising both anion complexes: $[W^{IV}(CN)_6(NN)]^{2-}$ and $[W^V(CN)_6(NN)]^-$ and the added cation $[A]^{n+}$, wherein the cation $[A]^{n+}$ is selected from the group consisting of $Mn^{2+}$, $Fe^{2+}$, $Fe^{3+}$, $Co^{2+}$, $Ni^{2+}$, $Ag^+$, $Zn^{2+}$, $Cd^{2+}$, $Hg^{2+}$, $Tl^{2+}$, $Pb^{2+}$, $Cu^{2+}$, $Ce^{3+}$, $Ce^{4+}$, $Nd^{3+}$, $La^{3+}$, $Pr^{3+}$, $Sm^{3+}$, $Gd^{3+}$, $Tb^{3+}$, $Dy^{3+}$, $Er^{3+}$, $Ho^{3+}$, $Yb^{3+}$, $Eu^{3+}$, $H^+$, $Na^+$, $K^+$, $Rb^+$, $Cs^+$, $Pb(bpy)^{2+}$, $Pb(bpy)_2^{2+}$, $Cd(bpy)^{2+}$, $Cd(bpy)_2^{2+}$, and $Zn(bpy)^{2+}$.

2. The method according to claim 1 wherein the mixture of $[W^{IV}(CN)_6(NN)]^{2-}$ and $[W^V(CN)_6(NN)]^-$ is prepared by incomplete oxidation of $[W^{IV}(CN)_6(NN)]^{2-}$ to $[W^V(CN)_6(NN)]^-$ with an oxidizing agent.

3. The method according to claim 2 wherein the oxidation is carried out with an oxidizing agent selected from a group consisting of $H_2O_2$, $KMnO_4$ and $Ce(NO_3)_4$.

4. The method according to claim 1 wherein the mixture of $[W^{IV}(CN)_6(NN)]^{2-}$ and $[W^V(CN)_6(NN)]^-$ is prepared by mixing an ion complex of a formula $[W^{IV}(CN)_6(NN)]^{2-}$ with an ion complex of a formula $[W^V(CN)_6(NN)]^-$.

5. The method according to claim 1, wherein the cation $[A]^{n+}$ is added in a form of its salt selected from the group consisting of $Cd(bpy)(NO_3)_2$, $Cd(NO_3)_2$, $Cd(NO_3)_2 \cdot 4H_2O$, $Zn(NO_3)_2$, $Zn(bpy)(NO_3)_2$, $ZnCl_2$, $Pb(NO_3)_2$, $Cu(CH_3COO)_2$, $AgNO_3$, $Gd(NO_3)_3$, $Tb(NO_3)_3$, $ErCl_3$, and $Hg(NO_3)_2$.

6. The method according to claim 1, wherein the formed salt molecules comprising anion complexes: $[W^{IV}(CN)_6(NN)]^{2-}$ and $[W^V(CN)_6(NN)]^-$ and the cations $[A]^{n+}$ are isolated from the reaction mixture by precipitation of the salt molecules or evaporation of the mixture solvent.

* * * * *